(12) United States Patent
Holm (10) Patent No.: US 11,783,837 B2
(45) Date of Patent: Oct. 10, 2023

(54) TRANSCRIPTION GENERATION TECHNIQUE SELECTION

(71) Applicant: Sorenson IP Holdings, LLC, Salt Lake City, UT (US)

(72) Inventor: Michael Holm, Bountiful, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 261 days.

(21) Appl. No.: 16/950,653

(22) Filed: Nov. 17, 2020

(65) Prior Publication Data

US 2021/0074296 A1 Mar. 11, 2021

Related U.S. Application Data

(63) Continuation of application No. 15/984,081, filed on May 18, 2018, now Pat. No. 10,867,609.

(51) Int. Cl.
*G10L 15/01* (2013.01)
*G10L 15/26* (2006.01)
*G10L 15/22* (2006.01)
*H04L 67/10* (2022.01)
*G10L 15/08* (2006.01)
(Continued)

(52) U.S. Cl.
CPC .............. *G10L 15/26* (2013.01); *G10L 15/01* (2013.01); *G10L 15/22* (2013.01); *G10L 15/08* (2013.01); *G10L 15/14* (2013.01); *G10L 15/16* (2013.01); *G10L 15/18* (2013.01); *G10L 15/28* (2013.01); *G10L 15/30* (2013.01); *H04L 67/10* (2013.01)

(58) Field of Classification Search
CPC ......... G10L 15/26; G10L 15/22; G10L 15/32; G10L 15/01; H04L 67/10; H04M 2201/40; H04M 3/42391
See application file for complete search history.

(56) References Cited

U.S. PATENT DOCUMENTS 6,535,848 B1 * 3/2003 Ortega .................... G10L 17/00
704/235
7,401,023 B1 * 7/2008 Schwartz ............ H04M 3/4931
704/277
(Continued)

OTHER PUBLICATIONS

Search Report and Written Opinion received in International Application No. PCT/US19/22810, dated Jun. 18, 2019.‡
U.S. Appl. No. 15/984,081, filed May 18, 2018.

*Primary Examiner* — Richard Z Zhu
(74) *Attorney, Agent, or Firm* — MASCHOFF BRENNAN; Debbie Gilmore (57) ABSTRACT

According to one or more aspects of the present disclosure, operations related to selecting a transcription generation technique may be disclosed. In some embodiments, the operations may include obtaining multiple user ratings that each correspond to a different one of multiple transcriptions. Each transcription may be obtained using a first transcription generation technique and may correspond to a different one of multiple communication sessions. The operations may further include selecting, for a subsequent communication session that occurs after the multiple communication sessions, a second transcription generation technique based on the user ratings. In addition, the operations may include providing the subsequent transcription to a device during the subsequent communication session.

19 Claims, 3 Drawing Sheets

(51) Int. Cl.
*G10L 15/18* (2013.01)
*G10L 15/30* (2013.01)
*G10L 15/16* (2006.01)
*G10L 15/28* (2013.01)
*G10L 15/14* (2006.01)

(56) References Cited

U.S. PATENT DOCUMENTS

| | | | | |
|---|---|---|---|---|
| 8,484,031 B1 ‡ | 7/2013 | Yeracaris | | G10L 15/30 704/27 |
| 8,560,321 B1 ‡ | 10/2013 | Yeracaris | | H04M 3/5166 704/27 |
| 8,738,375 B2 ‡ | 5/2014 | Ljolje | | G10L 15/22 704/23 |
| 8,762,143 B2 * | 6/2014 | Gilbert | | G10L 15/20 704/270.1 |
| 8,793,122 B2 ‡ | 7/2014 | White | | G10L 15/183 704/9 |
| 8,868,409 B1 * | 10/2014 | Mengibar | | G06F 40/30 704/250 |
| 8,930,189 B2 * | 1/2015 | Cath | | G10L 15/26 704/235 |
| 9,245,525 B2 ‡ | 1/2016 | Yeracaris | | G10L 15/32 |
| 9,368,106 B2 * | 6/2016 | Sidi | | G10L 15/04 |
| 9,472,185 B1 ‡ | 10/2016 | Yeracaris | | G10L 15/063 |
| 9,514,109 B2 * | 12/2016 | Yoon | | G09B 19/06 |
| 9,589,564 B2 * | 3/2017 | Sharifi | | G10L 15/005 |
| 9,620,128 B2 ‡ | 4/2017 | Levien | | G10L 19/00 |
| 9,646,606 B2 * | 5/2017 | Peng | | G10L 15/08 |
| 9,652,999 B2 ‡ | 5/2017 | Yoon | | G09B 19/06 |
| 9,741,347 B2 ‡ | 8/2017 | Yeracaris | | G10L 15/285 |
| 10,049,676 B2 ‡ | 8/2018 | Yeracaris | | G10L 15/30 |
| 10,147,419 B2 ‡ | 12/2018 | Yeracaris | | G10L 15/063 |
| 10,147,428 B1 * | 12/2018 | Shastry | | G10L 15/04 |
| 10,438,587 B1 ‡ | 10/2019 | Lam | | G10L 15/22 |
| 10,672,398 B1 * | 6/2020 | Lam | | B25J 11/0005 |
| 10,699,707 B2 * | 6/2020 | James | | G10L 15/183 |
| 10,714,093 B2 * | 7/2020 | Melendo Casado | | G10L 15/30 |
| 2007/0198269 A1 * | 8/2007 | Braho | | G10L 15/06 704/E15.002 |
| 2013/0006623 A1 * | 1/2013 | Chelba | | G10L 15/063 704/E15.045 |
| 2013/0024195 A1 * | 1/2013 | White | | G06F 3/0236 704/235 |
| 2013/0066630 A1 * | 3/2013 | Roe | | G10L 15/26 704/235 |
| 2014/0200737 A1 * | 7/2014 | Lortz | | B60R 16/037 701/1 |
| 2014/0278407 A1 * | 9/2014 | Chelba | | G10L 15/197 704/235 |
| 2014/0324434 A1 * | 10/2014 | Vozila | | G10L 15/063 704/257 |
| 2015/0058007 A1 * | 2/2015 | Kim | | G10L 15/26 704/235 |
| 2015/0348540 A1 * | 12/2015 | Ljolje | | G10L 15/01 704/235 |
| 2016/0012817 A1 * | 1/2016 | Plumpe | | G10L 15/063 704/244 |
| 2016/0063998 A1 * | 3/2016 | Krishnamoorthy | | G10L 15/22 704/254 |
| 2017/0069326 A1 * | 3/2017 | Rothwell | | G10L 15/01 |
| 2017/0206888 A1 * | 7/2017 | Engelke | | H04W 4/12 |
| 2018/0013886 A1 * | 1/2018 | Rae | | G10L 15/22 |
| 2018/0330735 A1 * | 11/2018 | Strope | | G10L 15/01 |
| 2019/0012315 A1 * | 1/2019 | Zhang | | G06F 40/47 |
| 2019/0108221 A1 * | 4/2019 | Nelson | | G10L 15/26 |
| 2019/0108493 A1 * | 4/2019 | Nelson | | G06Q 10/1095 |

\* cited by examiner
‡ imported from a related application

TRANSCRIPTION GENERATION TECHNIQUE SELECTION

CROSS-REFERENCE TO RELATED APPLICATION

This application is a continuation of U.S. patent application Ser. No. 15/984,081, filed on May 18, 2018, the disclosure of which is incorporated herein by reference in its entirety.

FIELD

The embodiments discussed in the present disclosure are related to selection of a transcription generation technique.

BACKGROUND

Transcriptions of audio communications between people may assist people that are hard-of-hearing or deaf to participate in the audio communications. To provide the transcriptions to a hard-of-hearing or deaf person, a particular device or application running on a mobile device or computer may be used to display text transcriptions of the audio being received by the hard of hearing or deaf person.

The subject matter claimed herein is not limited to embodiments that solve any disadvantages or that operate only in environments such as those described above. Rather, this background is only provided to illustrate one example technology area where some embodiments described herein may be practiced.

SUMMARY

According to one or more aspects of the present disclosure, operations related to selecting a transcription generation technique may be disclosed. In some embodiments, the operations may include obtaining multiple user ratings that each correspond to a different one of multiple transcriptions. Each transcription may be obtained using a first transcription generation technique and may correspond to a different one of multiple communication sessions. The operations may further include selecting, for a subsequent communication session that occurs after the multiple communication sessions, a second transcription generation technique based on the user ratings. In addition, the operations may include providing the subsequent transcription to a device during the subsequent communication session.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments in this disclosure relate to systems and methods that may be configured to transcribe audio of a communication session. For example, in some embodiments, audio of a communication session may be provided to a transcription system to transcribe the audio from a device that receives and/or generates the audio. A transcription of the audio generated by the transcription system may be provided back to the device for display to a user of the device. The transcription may assist the user to better understand what is being said during the communication session.

In some embodiments, different techniques of transcription generation may be used to generate a transcription of the audio. For example, a particular transcription generation technique may be initially selected from among the different transcription generation techniques.

In some embodiments, a transcription generation technique other than the transcription generation technique initially selected may be selected. For example, in some instances, transcriptions obtained via a particular transcription generation technique may receive unfavorable user ratings such that another transcription generation technique may be selected to obtain transcriptions of subsequent communication sessions.

In some embodiments, a first transcription generation technique may be different from a second transcription generation technique based on how the transcription generation is performed. For example, the first transcription generation technique may include generation of the transcription by a fully machine based automatic speech recognition (ASR) system. Fully machine based ASR systems may operate without human intervention and may be referred to in this disclosure as automatic systems. Alternatively or additionally, the second transcription generation technique may include generation of the transcription by a re-voicing transcription system.

Re-voicing transcription systems, referred to in this disclosure as re-voicing systems, may receive and broadcast audio to a captioning agent (e.g., a human captioning agent). The captioning agent may listen to the broadcast and speak the words from the broadcast. The words spoken by the captioning agent are captured to generate re-voiced audio. The re-voiced audio may be used by a speech recognition program to generate the transcription of the audio. In some embodiments, the speech recognition program may be trained to the voice of the captioning agent.

The systems and methods to select between different transcription generation techniques described in this disclosure may result in the improved display of transcriptions at a user device. For example, the systems and methods described in this disclosure may provide users with improved user experiences by selecting transcription generation techniques for a particular user based on that user's ratings of the different transcription generation techniques such that transcription generation techniques preferred by the user may be used.

Figure 1:
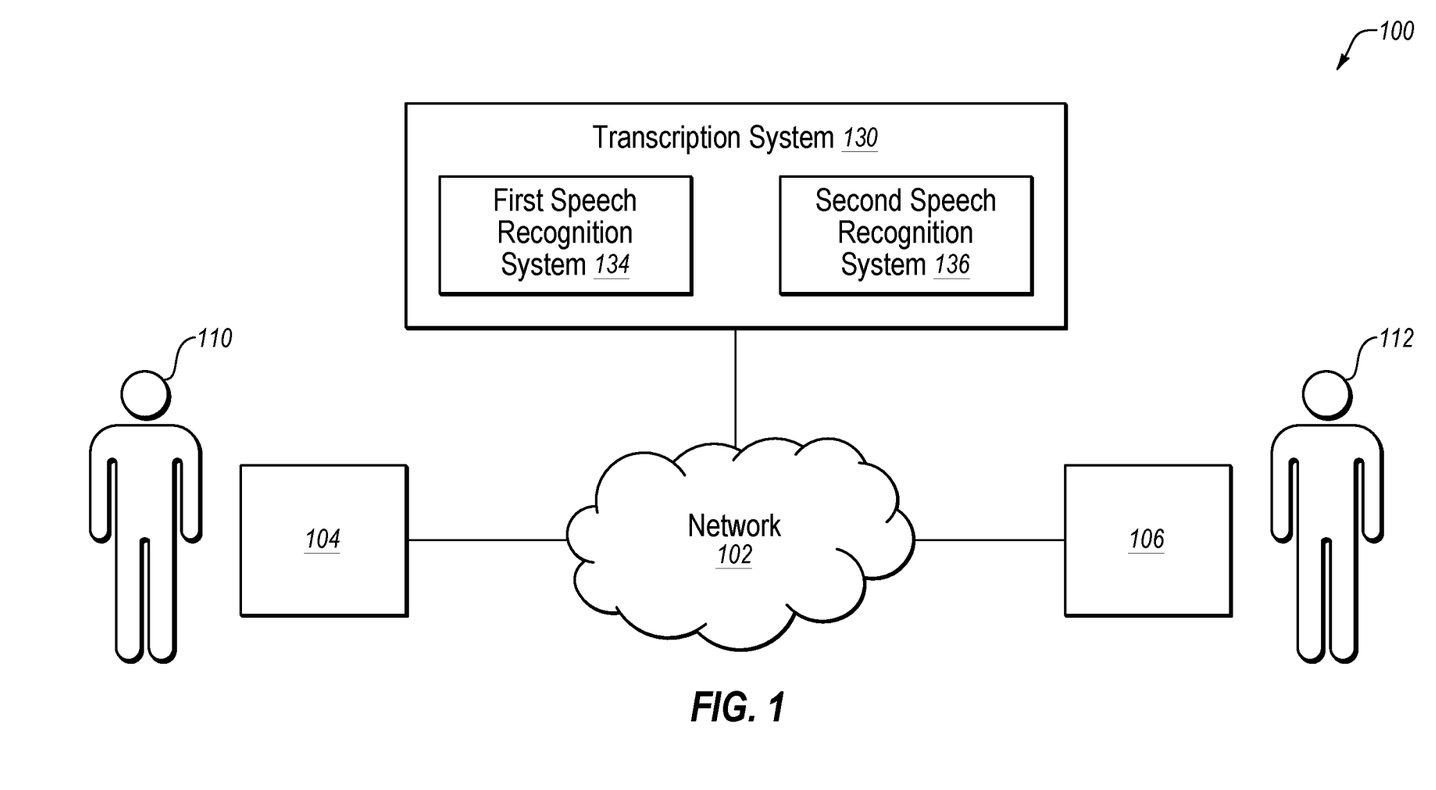
FIG. 1 illustrates an example environment for transcription of communications.

Turning to the figures, FIG. 1 illustrates an example environment 100 for transcription of communications. The environment 100 may be arranged in accordance with at least one embodiment described in the present disclosure. The environment 100 may include a network 102, a first device 104, a second device 106, and a transcription system 130. The transcription system 130 may include a first speech recognition system 134 and a second speech recognition system 136.

The network 102 may be configured to communicatively couple the first device 104, the second device 106, and the transcription system 130. In some embodiments, the network 102 may be any network or configuration of networks configured to send and receive communications between systems and devices. In some embodiments, the network 102 may include a wired network, an optical network, and/or a wireless network, and may have numerous different configurations. In some embodiments, the network 102 may also be coupled to or may include portions of a telecommunications network, including telephone lines, for sending data in a variety of different communication protocols, such as a plain old telephone system (POTS).

Each of the first and second devices 104 and 106 may be any electronic or digital computing device. For example, each of the first and second devices 104 and 106 may include a desktop computer, a laptop computer, a smartphone, a mobile phone, a tablet computer, a telephone, a phone console, a caption device, a captioning telephone, or any other computing device that may be used for communication between users of the first and second devices 104 and 106.

In some embodiments, each of the first device 104 and the second device 106 may include memory and at least one processor, which are configured to perform operations as described in this disclosure, among other operations. In some embodiments, each of the first device 104 and the second device 106 may include computer-readable instructions that are configured to be executed by each of the first device 104 and the second device 106 to perform operations described in this disclosure.

In some embodiments, each of the first and second devices 104 and 106 may be configured to establish communication sessions with other devices. For example, each of the first and second devices 104 and 106 may be configured to establish an outgoing communication session, such as a telephone call, video call, or other communication session, with another device over a telephone line or network. For example, each of the first device 104 and the second device 106 may communicate over a wireless cellular network, a wired Ethernet network, an optical network, or a POTS line.

In some embodiments, each of the first and second devices 104 and 106 may be configured to obtain audio during a communication session. The audio may be part of a video communication or an audio communication, such as a telephone call. As used in this disclosure, the term audio may be used generically to refer to sounds that may include spoken words. Furthermore, the term "audio" may be used generically to include audio in any format, such as a digital format, an analog format, or a propagating wave format. Furthermore, in the digital format, the audio may be compressed using different types of compression schemes. Also, as used in this disclosure, the term video may be used generically to refer to a compilation of images that may be reproduced in a sequence to produce video.

As an example of obtaining audio, the first device 104 may be configured to obtain first audio from a first user 110. For example, the first device 104 may obtain the first audio from a microphone of the first device 104 or from another device that is communicatively coupled to the first device 104.

The second device 106 may also be configured to obtain second audio from a second user 112. In some embodiments, second device 106 may obtain the second audio from a microphone of the second device 106 or from another device communicatively coupled to the second device 106. During the communication session, the first device 104 may provide the first audio for the second device 106. Alternatively or additionally, the second device 106 may provide the second audio for the first device 104. One or both of the first device 104 and the second device 106 may be configured to provide the first audio, the second audio, or both the first audio and the second audio to the transcription system 130.

In some embodiments, the transcription system 130 may be configured to generate a transcription of the audio received from either one or both of the first device 104 and the second device 106. The transcription system 130 may also provide the generated transcription of the audio to either one or both of the first device 104 and the second device 106. Either one or both of the first device 104 and the second device 106 may be configured to present the transcription received from the transcription system 130. For example, the first device 104 may be configured to display the received transcriptions on a display that is part of the first device 104 or that is communicatively coupled to the first device 104.

The transcription system 130 may be configured to generate a transcription of audio using the first speech recognition system 134 and/or the second speech recognition system 136. In some embodiments, each of the transcription system 130, the first speech recognition system 134, and the second speech recognition system 136 may include any configuration of hardware, such as processors, servers, and database servers that are networked together and configured to perform a task. For example, each of the transcription system 130, the first speech recognition system 134, and the second speech recognition system 136 may include one or multiple computing systems, such as multiple servers that each include memory and at least one processor.

The first speech recognition system 134 and the second speech recognition system 136 may each be configured to generate transcriptions from audio. In these and other embodiments, both the first speech recognition system 134 and the second speech recognition system 136 may be configured to recognize speech in the audio. Based on the recognized speech, the first speech recognition system 134 and the second speech recognition system 136 may output a transcription of the speech. The transcription may be a written version of the speech in the audio.

In some embodiments, the first speech recognition system 134 and the second speech recognition system 136 may be similar speech recognition systems. For example, in some embodiments, the first speech recognition system 134 and the second speech recognition system 136 may both be automatic systems that automatically recognize speech independent of human interaction to generate the transcription. In these and other embodiments, the first speech recognition system 134 and the second speech recognition system 136 may include speech engines that are trained to recognize speech. The speech engines may be trained for general speech and not specifically trained using speech patterns of the participants in the communication session, e.g., the first user 110 or the second user 112. Alternatively or additionally, the speech engines may be specifically trained using speech patterns of one of the participants of the communication session. Alternatively or additionally, both of the first speech recognition system 134 and the second speech recognition system 136 may be re-voicing systems.

In some embodiments, the first speech recognition system 134 and the second speech recognition system 136 may be different speech recognition systems. For example, in some embodiments, one of the first speech recognition system 134 and the second speech recognition system 136 may be an automatic system and another may be a re-voicing system. Additionally or alternatively, the first speech recognition system 134 may be a first automatic system and the second speech recognition system 136 may be a second automatic system that may use a different ASR algorithm or engine than the first automatic system.

In some embodiments, the transcription system 130 may be configured to obtain transcriptions using different transcription generation techniques. The transcription generation techniques may include the use of different speech recognition systems. For example, a first transcription generation technique may include the use of the first speech recognition system 134 and a second transcription generation technique may include the use of the second speech recognition system 136.

In some embodiments, a particular transcription generation technique may initially be selected to obtain transcriptions. In these or other embodiments, the particular transcription generation technique may initially be selected based on one or more factors such as cost, accuracy, user preference, etc. Additionally or alternatively, some factors may be weighted more than others in determining which transcription generation technique to initially select. For example, cost may be weighted higher than accuracy in some instances.

In some embodiments, after the initial selection of the particular transcription generation technique, another transcription generation technique may be selected to obtain transcriptions instead of the particular transcription generation technique. In these or other embodiments, the selection of the other transcription generation technique may be based on user ratings of transcriptions An example of selection of a transcription generation technique based on user ratings is now provided in the context of the environment 100 of FIG. 1. A first communication session may be established between the first device 104 and the second device 106. In these or other embodiments, the transcription system 130 may select a first transcription generation technique for the first communication session. In these or other embodiments, the first transcription generation technique may be an initially selected transcription generation technique.

In some embodiments, the first transcription generation technique may include providing audio from the second device 106 during the communication session to the transcription system 130 and directing the transcription system 130 to use the first speech recognition system 134 to generate a first transcription of the audio of the first communication session. In these and other embodiments, the first speech recognition system 134 may be an automatic system.

The transcription system 130 may provide the first transcription to the first device 104 during the first communication session. In these or other embodiments, during the first communication session or after the first communication session has terminated, the transcription system 130 may obtain a first user rating of the first transcription. In some embodiments, the first device 104 may be configured to present a request for the first user rating during the first communication session or after the first communication session has terminated. In these or other embodiments, the first device 104 may present the request as directed by the transcription system 103. Additionally or alternatively, the first device 104 may be configured to present the request independent of any direction from the transcription system 130.

In some embodiments, the request for the first user rating may include a prompt to evaluate a quality of the first transcription. In these or other embodiments, the prompting may include evaluating the quality based on a scale. The scale may be a numeric scale, an alphabetic scale, an adjective based scale (e.g., very bad, bad, satisfactory, good, very good, etc.) and/or any other suitable scale that may reflect user satisfaction or a user rating.

In some embodiments, the first user 110 may interact with a user interface of the first device 104 to indicate the first user rating. For example, the first user 110 may push a physical button or interact with an element on a screen of the first device 104 to indicate the first user rating. In these or other embodiments, the first device 104 may be configured to obtain the indication in response to words spoken by the first user 110. In some embodiments, the first device 104 may be configured to communicate the indicated first user rating to the transcription system 130 such that the transcription system 130 may obtain the first user rating from the first device 104.

In these or other embodiments, the first user rating may be obtained using any other suitable technique. For example, in some embodiments, the first user 110 may respond to a telephone survey regarding the first transcription and the response may be provided to the transcription system 130 as the first user rating. In these or other embodiments, the first user 110 may respond to an online survey (e.g., using the first device 104 or any other suitable device) regarding the first transcription and the response may be provided to the transcription system 130 as the first user rating. Additionally or alternatively, another device associated with the first user 110 (e.g., another device that may be used by the first user 110) may be configured to present a prompt to evaluate the quality of the first transcription.

In some embodiments, the transcription system 130 may be configured to associate the first user rating with a profile of the first user 110. The association may be such that the first user rating may be linked to the first user 110.

In some embodiments, the operations described above to obtain the first user rating with respect to the first transcription may be performed to obtain a user rating with respect to each of multiple other transcriptions that may be presented to the first user during other corresponding communication sessions of which the first user may participate. In some embodiments, each of the other transcriptions may be generated using the first transcription generation technique. In these or other embodiments, one or more of the other communication sessions may include the first device 104. Additionally or alternatively, one or more of the other communication sessions may include another device that may be associated with the user. In these or other embodiments, one or more of the other communication sessions may include the second device 106, another device associated with the second user 112, or another device that may be associated with a different user. In these or other embodiments, one or more of the user ratings of the other transcriptions may be associated with the profile of the first user 110.

In some embodiments, the transcription system 130 may be configured to select a second transcription generation technique for one or more other subsequent transcriptions of one or more other subsequent communication sessions. In these or other embodiments, the second transcription generation technique may include providing audio from the second device 106 during the communication session to the transcription system 130 and directing the transcription system 130 to use the second speech recognition system 136 to generate the subsequent transcriptions. In these and other embodiments, the second speech recognition system 136 may be different automatic system than the first speech recognition system 134. Additionally or alternatively, the second speech recognition system 136 may be a re-voicing system.

In some embodiments, the transcription system 130 may be configured to select the second transcription generation technique based on the user ratings that may be obtained with respect to the first transcription generation technique (referred to herein as "first technique ratings"). In these or other embodiments, the transcription system 130 may be configured to select the second transcription generation technique for the first user 110 based on the first technique ratings being associated with a profile of the first user 110.

In some embodiments, the transcription system 130 may evaluate the first technique ratings to determine a level of satisfaction of the first user 110 with respect to the first transcription generation technique. In these or other embodiments, the transcription system 130 may select, for transcriptions presented on devices associated with the first user 110, the second transcription generation technique over the first transcription generation technique in response to the level of satisfaction not meeting a satisfaction threshold.

For example, in some embodiments, the transcription system 130 may be configured to identify negative user ratings of the first technique ratings. For example, in some embodiments, the transcription system 130 may be configured to identify which of the first technique ratings meet a negative rating threshold. In some embodiments, meeting the negative rating threshold by a particular user rating may include having a user rating value that indicates a level of user satisfaction that is below a particular standard. For example, in some embodiments the user ratings may have values that are based on an adjective-based scale. In these or other embodiments meeting the negative rating threshold may include having a user rating that is "bad" or "very bad." As another example, in some embodiments the user ratings may have values that are based on a numerical scale from 1-5 in which 5 indicates a high level of user satisfaction and 1 indicates a low level of user satisfaction. In these or other embodiments, scores that are below "3" may meet the negative rating threshold. In these or other embodiments, the transcription system 130 may be configured to identify the user ratings that meet the negative rating threshold as "negative user ratings." The above examples of negative rating thresholds are merely examples as negative rating thresholds may vary depending on particular considerations that may be applicable to particular instances. For example, the negative rating thresholds may be determined based on rating system, consumer feedback, system constraints, consumer retention, and system use, among others.

In some embodiments, the transcription system 130 may be configured to select the second transcription generation technique based on a relationship of the negative user ratings with respect to other user ratings of the first technique ratings. For example, in some embodiments, the transcription system 130 may be configured to determine a count of the negative user ratings that indicates a number of negative user ratings. In response to the number of negative user ratings meeting a threshold number, the transcription system 130 may be configured to select the second transcription generation technique in place of the first transcription generation technique for one or more subsequent transcriptions that may be presented on a device associated with the first user 110. The threshold number of negative user ratings may vary depending on particular considerations that may be applicable to particular instances. For example, the threshold number may be determined based on consumer feedback, system constraints, consumer retention, and system use, among others.

As another example, the transcription system 130 may be configured to determine a ratio of negative user ratings with respect to the first technique ratings. For example, the transcription system 130 may be configured to determine a percentage of negative user ratings of the first technique ratings. In response to the ratio of negative user ratings meeting a ratio threshold, the transcription system 130 may be configured to select the second transcription generation technique for one or more subsequent transcriptions that may be presented on a device associated with the first user 110 (e.g., the first device 104 and/or any other device that may be used by the first user 110). The ratio threshold of negative user ratings may vary depending on particular considerations that may be applicable to particular instances. For example, the ratio threshold may be determined based on consumer feedback, system constraints, consumer retention, and system use, among others.

As another example, the transcription system 130 may be configured to determine an average user rating of the first technique ratings. In response to the average user rating meeting the negative rating threshold, the transcription system 130 may be configured to select the second transcription generation technique for one or more subsequent transcriptions that may be presented on a device associated with the first user 110. As indicated above, the negative rating threshold may vary depending on particular considerations that may be applicable to particular instances.

Additionally or alternatively, in some embodiments, the transcription system 130 may be configured to determine whether to select the second transcription generation technique in place of the first transcription generation technique based on how recently the negative user ratings were obtained or how recently the corresponding communication sessions of the negative user ratings occurred. For example, in some embodiments, the transcription system 130 weight more recent first technique ratings more than older first technique ratings. In some embodiments, the weighting may be linearly based on passage of time such that each first technique rating may have a different weight based on when it was obtained or on when the corresponding communication session occurred.

Additionally or alternatively, the weighting may be based on periods of time in which first technique ratings that fall within same time periods may be weighted the same and first technique ratings that fall within different time periods may be weighted differently. For example, the time periods may include the current month, the past month, the month prior to the past month, and any time prior to the month that is prior to the past month. In this particular example, first technique ratings associated with the current month may have a first weight, first technique ratings associated with the past month may have a second weight smaller than the first weight, first technique ratings associated with the month prior to the past month may have a third weight smaller than the second weight, and first technique ratings associated with any time prior to the month that is prior to the past month may have a fourth weight smaller than the third weight. The number of and duration of the time periods and the variations in the weights used in the weighting vary depending on particular considerations that may be applicable to particular instances. For example, the time periods and/or weighting may be determined based on consumer feedback, system constraints, consumer retention, and system use, among others.

By way of example, based on particular considerations, the transcription system 130 may only consider first technique ratings that have occurred within a particular time period (e.g., within the past week, past month, past 2 months, past 3 months, etc.) for identification of negative user ratings. As such, in this example, there may be two time periods, the particular time period and any time prior to the particular time period. Additionally, in this example, the weighting may be binary in which first technique ratings within the particular time period may be considered and first technique ratings outside of the particular time period may not be considered.

In these or other embodiments, the transcription system 130 may be configured to use the weighting in making determinations related to the relationship of negative user ratings with respect to the other user ratings of the first technique ratings. For example, first technique ratings with different weights may be given different count values in making the relationship determinations. For instance, first technique ratings with a first weighting may each be given a count value of "1," first technique ratings with a second weighting lower than the first weighting may each be given a count value of "0.5," and first technique ratings with a third weighting lower than the second weighting may each be given a count value of "0." The different count values may be used in determining the "number" of negative user ratings, the ratio of negative user ratings, the average user rating, or any other suitable rating analysis.

In some embodiments, the transcription system 130 may be configured to use the second transcription generation technique for all subsequent communication sessions that may be associated with the first user 110. In other embodiments, the transcription system 130 may be configured to select another transcription generation technique for one or more of the subsequent communication sessions.

For example, in some embodiments, the transcription system 130 may be configured to obtain subsequent user ratings with respect to the subsequent transcriptions that may be generated using the second transcription generation technique (referred to herein as "second technique ratings"). In these or other embodiments, the second technique ratings may be obtained in a similar or analogous manner as the first technique ratings. Additionally or alternatively, the transcription system 130 may be configured to select another transcription generation technique different from the second transcription generation technique based on the second technique ratings. In some embodiments, the other transcription generation technique may be selected in a manner similar or analogous to that described above with respect to selecting the second transcription generation technique based on the first technique ratings. In these or other embodiments, the other transcription generation technique may include a transcription generation technique different from the first transcription generation technique and the second transcription generation technique.

Additionally or alternatively, the other transcription generation technique may include the first transcription generation technique. In these or other embodiments, the first generation technique may be selected again in response to the first technique ratings and the second technique ratings indicating greater user satisfaction with respect to the first transcription generation technique than the second transcription generation technique.

Modifications, additions, or omissions may be made to the environment 100 without departing from the scope of the present disclosure. For example, in some embodiments, the transcription system 130 may include additional functionality. For example, the transcription system 130 may edit the transcriptions or make other alterations to the transcriptions after presentation of the transcriptions one or both of the first device 104 and the second device 106.

Alternatively or additionally, in some embodiments, the environment 100 may include additional devices. In these and other embodiments, the additional devices may be configured to obtain user ratings and/or present communications as described in this disclosure. For example, the first device 104 may receive a request for a communication from the second device 106. A third device may alert the first user 110 of the request and capture audio of the first user 110. Alternatively or additionally, a fourth device may present transcriptions to the first user 110. In these and other embodiments, each of the first device 104, the third device, and the fourth device may be associated with the first user 110, communicatively coupled, and coordinated to perform operations as described with respect to the first device 104 in this disclosure.

As another example, in some embodiments, the first speech recognition system 134 and the second speech recognition system 136 may share hardware, software, or other components. In these and other embodiments, the first speech recognition system 134 and the second speech recognition system 136 may not be completely separate systems. Rather, reference to the first speech recognition system 134 and the second speech recognition system 136 may refer to a manner in how the transcriptions are generated more than separate systems. As another example, in some embodiments, the components of the transcription system 130 may be coupled over a network. For example, the first speech recognition system 134 may be coupled with second speech recognition system 136 over a network, such as the network 102. Additionally or alternatively, the first speech recognition system 134 and/or the second speech recognition system 136 may be part of third-party systems that may be used by the transcription system 130 to obtain the transcriptions. Further, in some embodiments, the transcription system 120 may utilize or include any number of speech recognition systems in addition to or instead of the first speech recognition system 134 and/or the second speech recognition system 136.

Further, the locations of certain operations being described as being performed are given as examples and not limiting. For example, in some embodiments, the first device 104 and/or the second device 106 may be configured to perform one or more operations related to selection of a transcription generation technique.

In addition, in some embodiments, different transcription generation techniques may be used for communication sessions that may be conducted on a same device. For example, in some instances the first user 110 and a third user may both use the first device 104 to conduct communication sessions. In these and other embodiments, the first transcription generation technique may be selected for the first user 110 based on user ratings associated with the first user 110 (e.g., in a profile of the first user 110) and the second transcription generation technique may be selected for the third user based on user ratings associated with the third user (e.g., in a profile of the third user). In these or other embodiments, when the first user 110 is participating in a communication session using the first device 104, the transcriptions presented by the first device 104 may be obtained from the first transcript generation technique. Additionally or alternatively, when the third user is participating in a communication session using the first device 104, the transcriptions presented by the first device 104 may be obtained from the second transcript generation technique.

Figure 2:
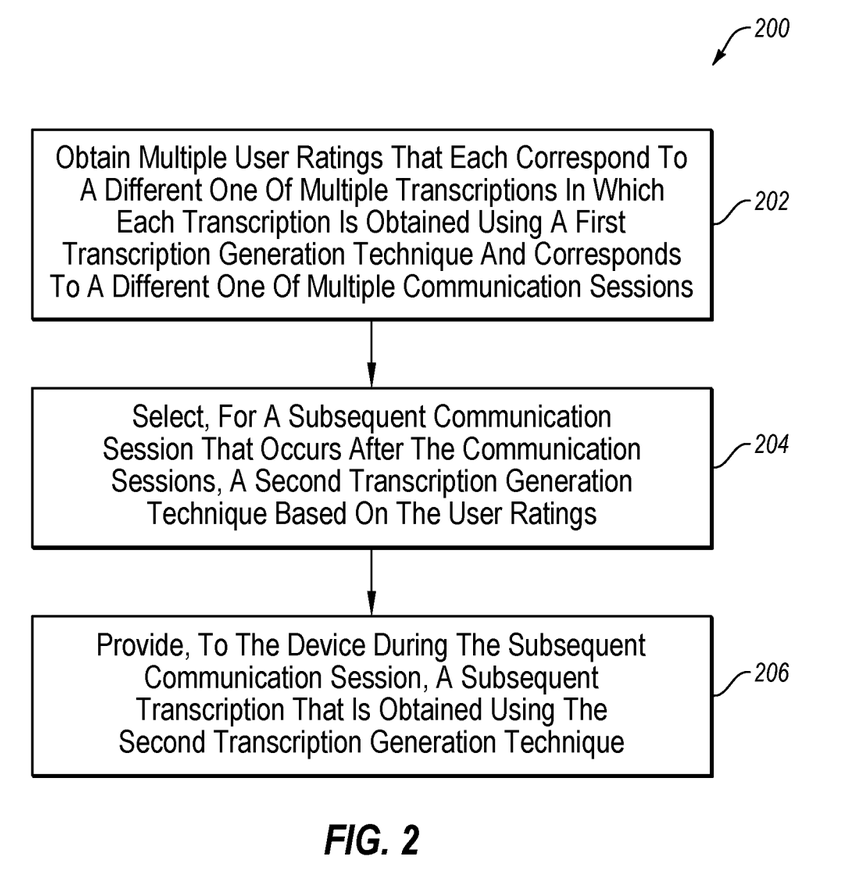
FIG. 2 illustrates a flowchart of an example method to select a transcription generation technique.

FIG. 2 illustrates a flowchart of an example method 200 to select a transcription generation technique. The method 200 may be arranged in accordance with at least one embodiment described in the present disclosure. One or more operations of the method 200 may be performed, in some embodiments, by a device or system, such as the transcription system 130, the first device 104, and/or the second device 106 of FIG. 1 or the system 300 of FIG. 3, or another device or combination of devices. In these and other embodiments, the method 200 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 200 may begin at block 202, where multiple user ratings may be obtained. The user ratings may each correspond to a different one of multiple transcriptions. In these or other embodiments, each of the multiple transcriptions may be obtained using a first transcription generation technique. Additionally or alternatively, each of the multiple transcriptions may correspond to a different one of multiple communication sessions. In some embodiments, the first transcription generation technique may include using a first fully machine based automatic speech recognition system to generate the transcriptions.

In some embodiments, obtaining a particular user rating may include causing presentation on the device of a request for the particular user rating of a particular transcription. Additionally or alternatively, the presentation of the request may occur after termination of a particular communication session that corresponds to the particular transcription. In these or other embodiments, the particular user rating may be obtained from the device based on a response to the request that may be obtained by the device.

At block 204, a second transcription generation technique may be selected based on the user ratings. In some embodiments, the second transcription generation technique may be selected for a subsequent communication session that occurs after the multiple communication sessions. In these or other embodiments, the second transcription generation technique may include using a second fully machine based automatic speech recognition system different from the first fully machine based automatic speech recognition system used by the first transcription generation technique. Additionally or alternatively, the second transcription generation technique may include using a re-voicing speech recognition system.

In some embodiments, selection of the second transcription generation technique may include determining a number of negative user ratings of the user ratings. In these or other embodiments, the negative user ratings may be determined as being negative by meeting a negative rating threshold. Additionally or alternatively, the second transcription generation technique may be selected based on the number of negative user ratings. For example, in some embodiments, the second transcription generation technique may be selected based on the number of negative user ratings meeting a number threshold.

In these or other embodiments, selection of the second transcription generation technique may include determining a ratio of negative user ratings with respect to the user ratings. In these or other embodiments, the second transcription generation technique may be selected based on the ratio of negative user ratings with respect to the user ratings. For example, in some embodiments, the second transcription generation technique may be selected based on the ratio of negative user ratings meeting a ratio threshold.

In these or other embodiments, selection of the second transcription generation technique may include determining an average user rating of the user ratings. In these or other embodiments, the second transcription generation technique may be selected based on the average user rating meeting the negative rating threshold.

At block 206, a subsequent transcription may be provided to the device during the subsequent communication session. In some embodiments, the subsequent transcription may be obtained during the subsequent communication session using the second transcription generation technique in which the second transcription generation technique is used based on being selected at block 204.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 200 may further include operations related to obtaining the multiple transcriptions that correspond to the user ratings. In these or other embodiments, the method 200 may include operations related to providing the transcriptions to the device during the corresponding communication sessions.

Figure 3:
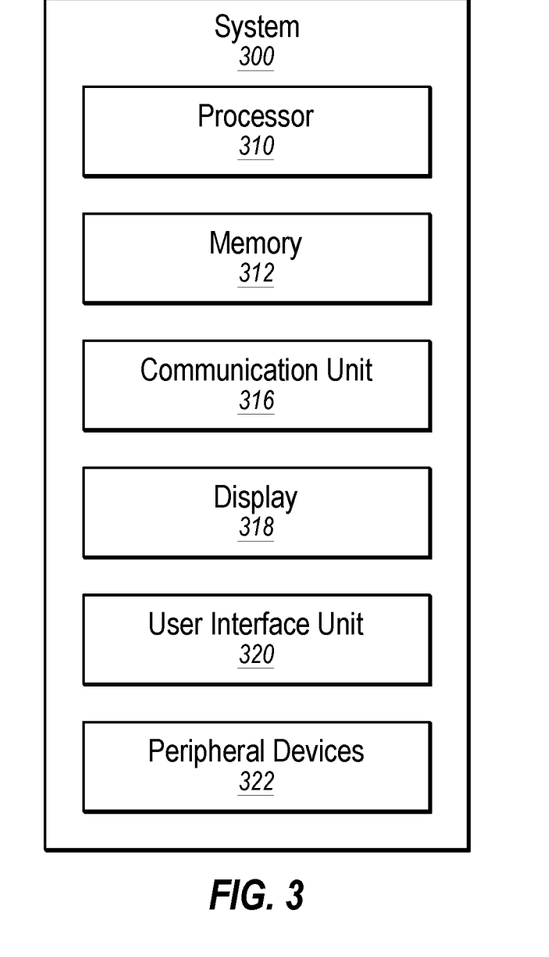
FIG. 3 illustrates an example system that may be used during transcription of communications.

FIG. 3 illustrates an example system 300 that may be used during transcription of communications. The system 300 may be arranged in accordance with at least one embodiment described in the present disclosure. The system 300 may include a processor 310, memory 312, a communication unit 316, a display 318, a user interface unit 320, and a peripheral device 322, which all may be communicatively coupled. In some embodiments, the system 300 may be part of any of the systems or devices described in this disclosure.

For example, the system 300 may be part of the first device 104 of FIG. 1 and may be configured to perform one or more of the tasks described above with respect to the first device 104. As another example, the system 300 may be part of the second device 106 of FIG. 1 and may be configured to perform one or more of the tasks described above with respect to the second device 106. As another example, the system 300 may be part of the transcription system 130 of FIG. 1 and may be configured to perform one or more of the tasks described above with respect to the transcription system 130.

Generally, the processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 3, it is understood that the processor 310 may include any number of processors distributed across any number of networks or physical locations that are configured to perform individually or collectively any number of operations described herein. In some embodiments, the processor 310 may interpret and/or execute program instructions and/or process data stored in the memory 312. In some embodiments, the processor 310 may execute the program instructions stored in the memory 312.

For example, in some embodiments, the processor 310 may execute program instructions stored in the memory 312 that are related to selecting a transcription generation technique for a communication session such that the system 300 may perform or direct the performance of the operations associated therewith as directed by the instructions. In these and other embodiments, the instructions may be used to perform one or more operations of the method 200 of FIG. 2.

The memory 312 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 310.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 310 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuijten,* 500 F.3d 1346 (Fed. Cir. 2007). Combinations of the above may also be included within the scope of computer-readable media.

The communication unit 316 may include any component, device, system, or combination thereof that is configured to transmit or receive information over a network. In some embodiments, the communication unit 316 may communicate with other devices at other locations, the same location, or even other components within the same system. For example, the communication unit 316 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication unit 316 may permit data to be exchanged with a network and/or any other devices or systems described in the present disclosure. For example, when the system 300 is included in the first device 104 of FIG. 1, the communication unit 316 may allow the first device 104 to communicate with the transcription system 130.

The display 318 may be configured as one or more displays, like an LCD, LED, or other type of display. The display 318 may be configured to present video, text captions, user interfaces, and other data as directed by the processor 310. For example, when the system 300 is included in the first device 104 of FIG. 1, the display 318 may be configured to present second video from a second device, a transcript of second audio from the second device, and/or a selectable element.

The user interface unit 320 may include any device to allow a user to interface with the system 300. For example, the user interface unit 320 may include a mouse, a track pad, a keyboard, buttons, and/or a touchscreen, among other devices. The user interface unit 320 may receive input from a user and provide the input to the processor 310. In some embodiments, the user interface unit 320 and the display 318 may be combined.

The peripheral devices 322 may include one or more devices. For example, the peripheral devices may include a microphone, an imager, and/or a speaker, among other peripheral devices. In these and other embodiments, the microphone may be configured to capture audio. The imager may be configured to capture images. The images may be captured in a manner to produce video or image data. In some embodiments, the speaker may broadcast audio received by the system 300 or otherwise generated by the system 300.

Modifications, additions, or omissions may be made to the system 300 without departing from the scope of the present disclosure. For example, in some embodiments, the system 300 may include any number of other components that may not be explicitly illustrated or described. Further, depending on certain implementations, the system 300 may not include one or more of the components illustrated and described.

As indicated above, the embodiments described herein may include the use of a special purpose or general purpose computer (e.g., the processor 310 of FIG. 3) including various computer hardware or software modules, as discussed in greater detail below. Further, as indicated above, embodiments described herein may be implemented using computer-readable media (e.g., the memory 312 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
obtaining, at a system, a first rating of a first transcription of audio from a second user device during a first communication session involving a first user device and the second user device, the first rating indicating feedback from the first user device regarding the first transcription and the first transcription obtained using a first transcription generation technique, wherein the system is not part of the first communication session;
after termination of the first communication session, obtaining, at the system, a second rating of a second transcription of audio from a third user device during a second communication session involving the first user device and the third user device, where the third user device is different from the second user device, the second rating indicating feedback from the first user device regarding the second transcription and the second transcription obtained using the first transcription generation technique, wherein the system and the second user device are not part of the second communication session;
selecting, using the first and second ratings, a second transcription generation technique for a third communication session involving the first user device and a fourth user device that is different from the second user device and the third user device, the second transcription generation technique selected to generate a third transcription of audio from the fourth user device; and
obtaining, during the third communication session, the third transcription that is generated using the second transcription generation technique.

2. The method of claim 1, wherein:
the first transcription generation technique includes using a fully machine based automatic speech recognition system to generate the first transcription and the second transcription; and
the second transcription generation technique includes using a re-voicing speech recognition system to generate the third transcription.

3. The method of claim 1, wherein:
the first transcription generation technique includes using a first fully machine based automatic speech recognition system to generate the first transcription and the second transcription; and
the second transcription generation technique includes using a second fully machine based automatic speech recognition system to generate the third transcription.

4. The method of claim 1, wherein obtaining the first rating includes:
directing presentation of a request for the first rating on the first user device after termination of the first communication session; and
obtaining the first rating from the first user device based on a response to the request.

5. The method of claim 1, wherein selecting the second transcription generation technique includes:
determining a number of negative ratings of a plurality of ratings from the first user device, which include the first rating and the second rating, that meet a negative rating threshold; and
selecting the second transcription generation technique based on the number of negative ratings satisfying a number threshold.

6. The method of claim 1, wherein selecting the second transcription generation technique includes:
determining a ratio of ratings that meet a negative rating threshold with respect to a plurality of ratings from the first user device that include the first rating and the second rating; and
selecting the second transcription generation technique based on the ratio of ratings satisfying a ratio threshold.

7. The method of claim 1, wherein selecting the second transcription generation technique includes:

determining an average rating of a plurality of ratings from the first user device that include the first rating and the second rating; and selecting the second transcription generation technique based on the average rating satisfying a negative rating threshold.

8. At least one non-transitory computer-readable media configured to store one or more instructions that in response to being executed by at least one computing system cause performance of the method of claim 1.

9. A method comprising:

obtaining, at a system, a first rating of a first transcription of audio from a second user device during a first communication session involving a first user device and the second user device, the first rating indicating a quality of the first transcription, the first transcription obtained using a first transcription generation technique, wherein the system is not part of the first communication session;

obtaining, at the system, a second rating of a second transcription of audio from a third user device during a second communication session involving the first user device and the third user device, where the third user device is different from the second user device, the second rating indicating a quality of the second transcription, the second transcription obtained using the first transcription generation technique, wherein the system and the second user device are not part of the second communication session;

selecting, using the first and second ratings, a second transcription generation technique for a third communication session involving a fourth user device that is different from the second user device and the third user device, the second transcription generation technique selected to generate a third transcription of audio from the fourth user device; and obtaining, during the third communication session, the third transcription that is generated using the second transcription generation technique.

10. The method of claim 9, wherein:

the first transcription generation technique includes using a fully machine based automatic speech recognition system to generate the first transcription and the second transcription; and the second transcription generation technique includes using a re-voicing speech recognition system to generate the third transcription.

11. The method of claim 9, wherein:

the first transcription generation technique includes using a first fully machine based automatic speech recognition system to generate the first transcription and the second transcription; and the second transcription generation technique includes using a second fully machine based automatic speech recognition system to generate the third transcription.

12. The method of claim 9, wherein obtaining the first rating includes:

directing presentation of a request for the first rating on the first user device after termination of the first communication session; and obtaining the first rating from the first user device based on a response to the request.

13. The method of claim 9, wherein selecting the second transcription generation technique includes:

determining a number of negative ratings of a plurality of ratings from the first user device, which include the first rating and the second rating, that meet a negative rating threshold; and selecting the second transcription generation technique based on the number of negative ratings satisfying a number threshold.

14. The method of claim 9, wherein selecting the second transcription generation technique includes:

determining a ratio of ratings that meet a negative rating threshold with respect to a plurality of ratings from the first user device that include the first rating and the second rating; and selecting the second transcription generation technique based on the ratio of ratings satisfying a ratio threshold.

15. The method of claim 9, wherein selecting the second transcription generation technique includes:

determining an average rating of a plurality of ratings from the first user device that include the first rating and the second rating; and selecting the second transcription generation technique based on the average rating satisfying a negative rating threshold.

16. At least one non-transitory computer-readable media configured to store one or more instructions that in response to being executed by at least one computing system cause performance of the method of claim 9.

17. A system comprising:

one or more processors; and one or more computer-readable media configured to store instructions that in response to being executed by the one or more processors cause the system to perform operations, the operations comprising:

obtain a first rating of a first transcription of audio from a second user device during a first communication session involving a first user device and the second user device, the first rating indicating a quality of the first transcription, the first transcription obtained using a first transcription generation technique, wherein the system is not part of the first communication session;

obtain a second rating of a second transcription of audio from a third user device during a second communication session involving the first user device and the third user device, where the third user device is different from the second user device, the second rating indicating a quality of the second transcription, the second transcription obtained using the first transcription generation technique, wherein the system and the second user device are not part of the second communication session;

select, based on the first and second ratings, a second transcription generation technique for a third communication session involving the first user device and a fourth user device that is different from the second user device and the third user device, the second transcription generation technique selected to generate a third transcription of audio from the fourth user device; and obtain, during the third communication session, the third transcription that is generated using the second transcription generation technique.

18. The system of claim 17, wherein:

the first transcription generation technique includes using a fully machine based automatic speech recognition system to generate the first transcription and the second transcription; and the second transcription generation technique includes using a re-voicing speech recognition system to generate the third transcription.

19. The system of claim 17, wherein:

the first transcription generation technique includes using a first fully machine based automatic speech recognition system to generate the first transcription and the second transcription; and the second transcription generation technique includes using a second fully machine based automatic speech recognition system to generate the third transcription.

\* \* \* \* \*